United States Patent
Chen et al.

(10) Patent No.: US 6,967,800 B1
(45) Date of Patent: Nov. 22, 2005

(54) DISK DRIVE SUSPENSION ASSEMBLY INCLUDING A BASE PLATE WITH MASS REDUCTION OPENINGS AT DISTAL CORNERS

(75) Inventors: Yih-Jen D. Chen, Milpitas, CA (US); Gwo-Jeng Lo, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 130 days.

(21) Appl. No.: 10/427,495

(22) Filed: Apr. 30, 2003

(51) Int. Cl.[7] ............................................. G11B 5/48
(52) U.S. Cl. ............................... 360/57.01; 360/244.8
(58) Field of Search ........................ 360/97.02, 244.5, 360/244.6, 244.8, 97.01

(56) References Cited

U.S. PATENT DOCUMENTS

| | | | | |
|---|---|---|---|---|
| 5,870,252 A | * | 2/1999 | Hanrahan ................. | 360/244.8 |
| 5,894,381 A | * | 4/1999 | Allen et al. .............. | 360/244.9 |
| 5,995,335 A | * | 11/1999 | Jurgenson et al. ........ | 360/244.8 |
| 6,063,508 A | * | 5/2000 | Hanrahan et al. ........... | 428/596 |
| 6,141,187 A | * | 10/2000 | Wong et al. .............. | 360/244.8 |
| 6,399,179 B1 | * | 6/2002 | Hanrahan et al. ........... | 428/131 |
| 6,731,472 B2 | * | 5/2004 | Okamoto et al. ........ | 360/294.3 |

* cited by examiner

Primary Examiner—Angel Castro
(74) Attorney, Agent, or Firm—Stetina Brunda Garred & Brucker

(57) ABSTRACT

A disk drive suspension assembly. The suspension assembly includes a load beam and a base plate with a longitudinal axis. The base plate includes an actuator arm and an opposing actuator arm end. The head gimbal end is disposed in mechanical communication with the load beam for distally supporting the load beam. The head gimbal end defines opposing first and second distal corners. The base plate includes first and second mass reduction openings formed through the base plate symmetrically about the longitudinal axis at the head gimbal end for locally reducing mass to mitigate torsional vibration mode frequency about the longitudinal axis. The first mass reduction opening is disposed at the head gimbal end between the first distal corner and the longitudinal axis. The second mass reduction opening is disposed at the head gimbal end between the second distal corner and the longitudinal axis.

12 Claims, 4 Drawing Sheets

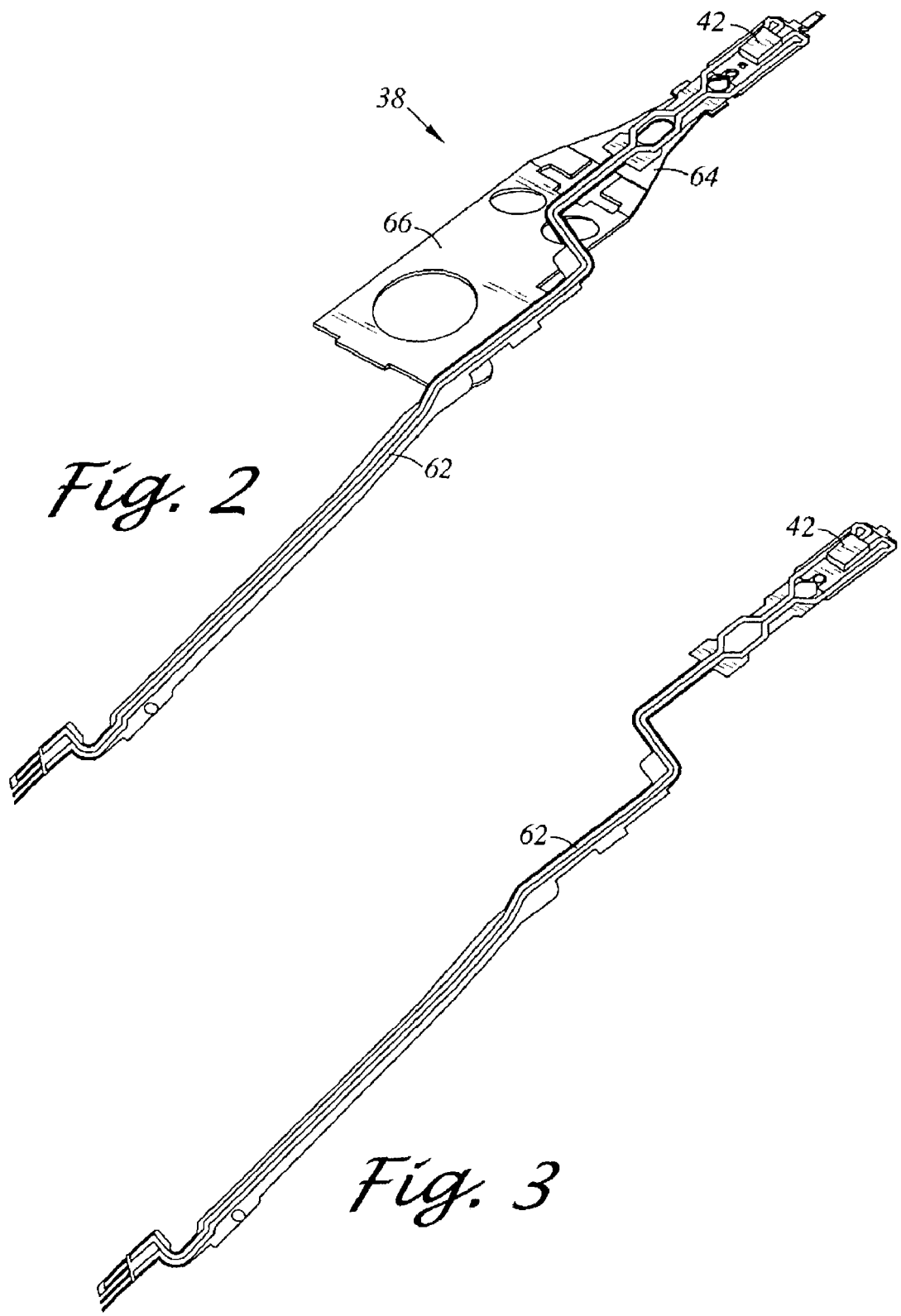

DISK DRIVE SUSPENSION ASSEMBLY INCLUDING A BASE PLATE WITH MASS REDUCTION OPENINGS AT DISTAL CORNERS

BACKGROUND OF THE INVENTION

1. Field of the Invention

The present invention relates generally to disk drives, and in particular to a disk drive suspension assembly including a base plate with mass reduction openings at distal corners.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA). The spindle motor includes a spindle motor hub that is rotatably attached to the disk drive base. The hub has an outer hub flange that supports a lowermost one of the disks. Additional disks may be stacked and separated with annular disk spacers that are disposed about the hub.

The head stack assembly has an actuator assembly having at least one transducer head (typically a magneto-resistive or "MR" head), typically several, for reading and writing data from and to the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

In further detail, the head stack assembly includes an actuator assembly, at least one head gimbal assembly, and a flex circuit cable assembly. A conventional "rotary" or "swing-type" actuator assembly typically includes an actuator having an actuator body. The actuator body is configured to rotate on a pivot assembly between limited positions about an axis of rotation. A coil support extends from one side of the actuator body. A coil is supported by the coil support and is configured to interact with one or more permanent magnets to form a voice coil motor. One or more actuator arms extend from an opposite side of the actuator body. To facilitate rotational movement of the actuator, the actuator assembly further includes the actuator body that has a bore and a pivot bearing cartridge engaged within the bore. Each magnetic disk includes opposing disk surfaces. Data may be recorded on a single surface or both along data annular regions. As such, the head stack assembly may be pivoted such that each transducer head is disposed adjacent the various data annular regions from adjacent the outer diameter to the inner diameter of each disk.

Conductive traces (copper for example) are laid on a dielectric layer (such as a polyimide film) formed on the head gimbal assembly. The dielectric layer electrically insulates the conductive traces from the gimbal (which may be formed of stainless steel for example). Such technologies are variously named TSA (Trace Suspension Assembly), NSL (No Service Loop), FOS (Flex On Suspension) and the like. These conductive traces interconnect the elements of the transducer head to drive a preamp and the circuits associated therewith. The gimbal may be integrated with or formed from with the dielectric layer and is sometimes referred to as a "trace gimbal".

A typical suspension assembly includes a load beam (also referred to as a "suspension") and a base plate (also referred to as a "nut plate" or "swage plate"). The base plate is used to attach the load beam to the end of the actuator arms, typically through a swage engagement. The suspension assembly further includes a gimbal, such as a trace gimbal, attached to the end of the load beam. A hinge plate may also be utilized which is interposed between the load beam and the base plate. The suspension assembly with the transducer head attached to the gimbal is typically referred to as a head gimbal assembly.

The transducer head is disposed within the slider. The load beam has a spring function that provides a "gram load" biasing force and a hinge function that permits the head to follow the surface contour of the spinning disk. The load beam has an actuator end that connects to the actuator arm and a gimbal end that connects to the gimbal that carries the head and transmits the gram load biasing force to the slider to "load" the slider against the disk. A rapidly spinning disk develops a laminar airflow above its surface that lifts the slider including the head away from the disk in opposition to the gram load biasing force. The head is said to be "flying" over the disk when in this state.

During operation, the suspension assembly is subject to various modes of resonant vibration. As disk drives have progressed to higher areal densities, the track width has correspondingly been reduced. This has increased the sensitivity to such resonant vibrations in relation to the overall performance of the disk drive. Accordingly, there is a need in the art for a disk drive having an improved suspension assembly design in comparison to the prior art.

SUMMARY OF THE INVENTION

An aspect of the present invention can be regarded as a suspension assembly for use with an actuator arm of a disk drive. The suspension assembly includes a load beam and a generally rectangular base plate. The base plate defines a longitudinal axis. The base plate includes an actuator arm end including a swage opening disposed along the longitudinal axis for swage attachment to the actuator arm. The base plate further includes a head gimbal end disposed opposite the actuator arm end. The head gimbal end is disposed in mechanical communication with the load beam for distally supporting the load-beam. The head gimbal end defines opposing first and second distal corners. The base plate further includes first and second mass reduction openings formed through the base plate symmetrically about the longitudinal axis at the head gimbal end for locally reducing mass to mitigate torsional vibration mode frequency about the longitudinal axis. The first mass reduction opening is disposed at the head gimbal end between the first distal corner and the longitudinal axis. The second mass reduction opening is disposed at the head gimbal end between the second distal corner and the longitudinal axis.

According to various embodiments, the mass reduction openings may be generally circular shaped or polygon shaped for example. The mass reduction openings may each generally define a mass reduction opening center with each mass reduction opening center being bias towards the head gimbal end. The base plate may further include third and fourth mass reduction openings formed through the base plate symmetrically disposed about the longitudinal axis. The third and forth mass reduction openings are disposed between the swage opening and the first and second mass reduction openings. The base plate may be formed of stainless steel.

According to another aspect of the present invention, there is provided a disk drive. The disk drive includes a disk drive base. The disk drive further includes an actuator rotatably coupled to the disk drive base and includes an actuator arm. The disk drive further includes a suspension assembly as described above.

BRIEF DESCRIPTION OF THE DRAWINGS

FIG. 2 is an enlarged perspective view of a suspension assembly with a slider of FIG. 1 in accordance with an aspect of the present invention;

FIG. 3 is a perspective view of a trace gimbal with a slider attached of the FIG. 2;

DESCRIPTION OF THE PREFERRED EMBODIMENTS

Figure 1:
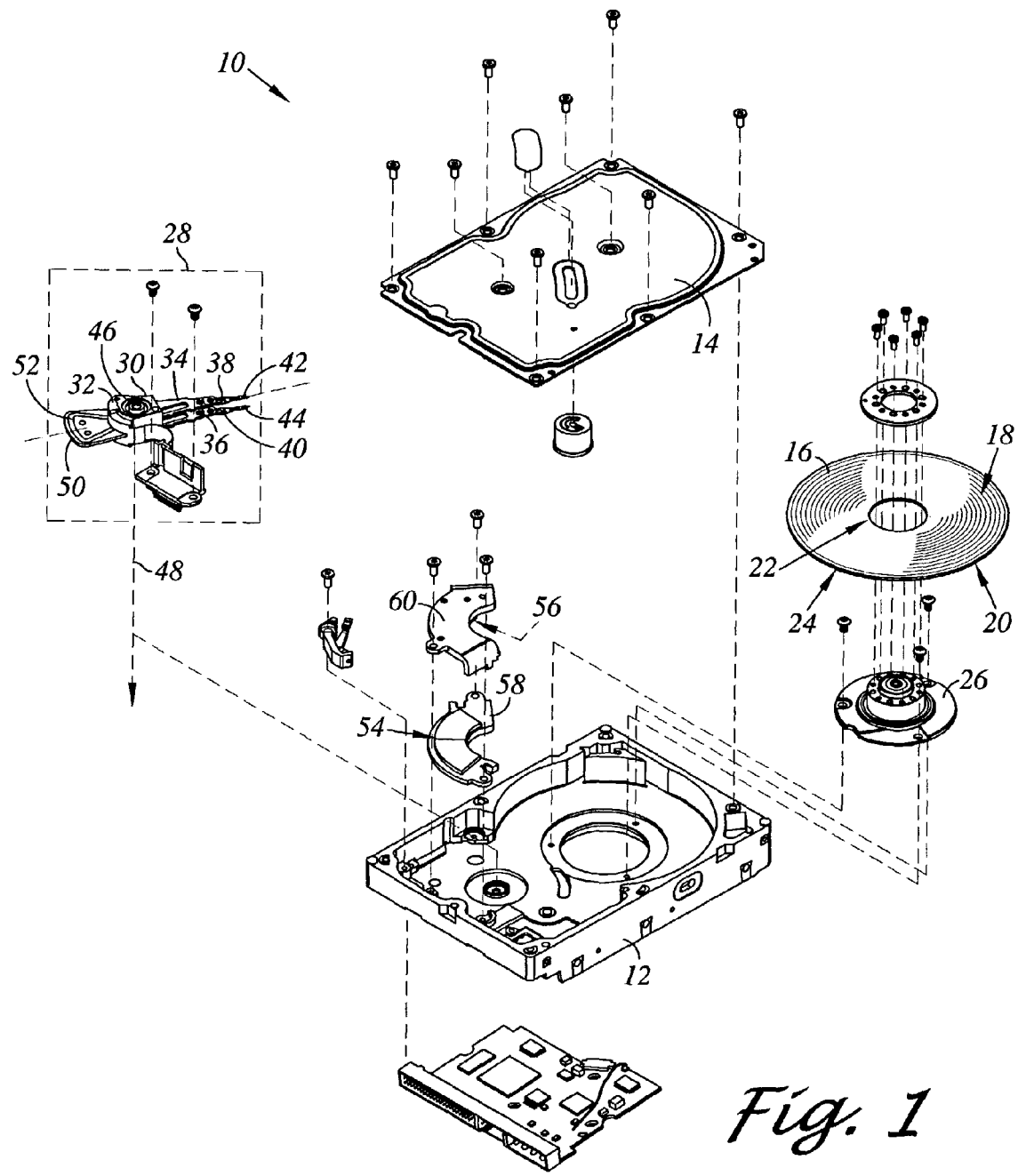
FIG. 1 is an exploded perspective view of a disk drive in accordance with the present invention.

Referring now to the drawings wherein the showings are for purposes of illustrating preferred embodiments of the present invention only, and not for purposes of limiting the same, FIGS. 1–10 illustrate a disk drive and suspension assemblies in accordance with the aspects of the present invention.

Referring now to FIG. 1, there is depicted an exploded perspective view of a disk drive 10 as constructed in accordance with an aspect of the present invention. The disk drive 10 includes a head disk assembly (HDA) and a printed circuit board assembly (PCBA). The head disk assembly includes a disk drive housing having disk drive housing members, such as a disk drive base 12 and a cover 14. The disk drive base 12 and the cover 14 collectively house at least one magnetic disk 16. The disk 16 contains a plurality of tracks for storing data. The tracks are disposed upon opposing first and second disk surfaces 18, 20 of the disk 16 that extend between an inner disk edge 22 (associated with the inner diameter) and an outer disk edge 24 (associated with the outer diameter) of the disk 16. The head disk assembly further includes a spindle motor 26 for rotating the disk 16. The head disk assembly further includes a head stack assembly 28 rotatably attached to the disk drive base 12 in operable communication with the disk 16. The head stack assembly 28 includes a rotatable actuator 30. In the embodiment shown, the actuator 30 includes an actuator body 32 and actuator arms 34, 36 that extend from the actuator body 32. Distally attached to the actuator arms 34, 36 are suspension assemblies 38, 40. The suspension assemblies 38, 40 respectively support sliders 42, 44. Each of the sliders 42, 44 include a transducer head. The suspension assemblies 38, 40 with the sliders 42, 44 are referred to as head gimbal assemblies. It is contemplated that the number of actuator arms and suspension assemblies may vary depending upon the number of disks and disk surfaces utilized.

The actuator body 32 includes a bore, and the actuator 30 further includes a pivot bearing cartridge 46 engaged within the bore for facilitating the actuator body 32 to rotate between limited positions about an axis of rotation 48. The actuator 30 further includes a coil support 50 that extends from one side of the actuator body 32 opposite the actuator arms 34, 36. In this embodiment, the coil support 50 is configured to support a coil 52. A pair of magnetic elements 54, 56 is supported to mounts 58, 60 which are attached to the disk drive base 12 (magnetic element 56 is indicated by the dashed lead line and it is understood the magnetic element 56 is disposed underneath the mount 60). The coil 52 interacts with the magnetic elements 54, 56 to form a voice coil motor for controllably rotating the actuator 30.

Figure 4:
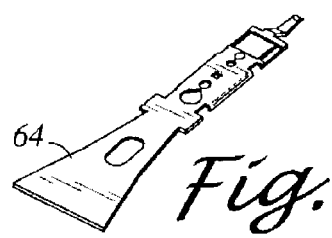
FIG. 4 is an enlarged perspective view of a load beam of the suspension assembly of FIG. 2.
Figure 5:
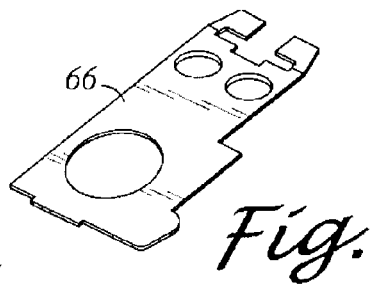
FIG. 5 is an enlarged perspective view of a hinge plate of the suspension assembly of FIG. 2.
Figure 6:
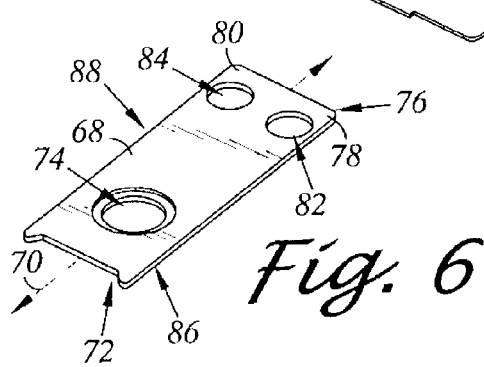
FIG. 6 is an enlarged perspective view of a base plate of the suspension assembly of FIG. 2, including mass reduction openings.
Figure 7:
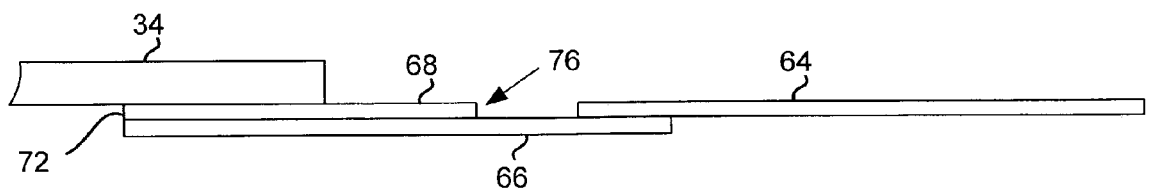
FIG. 7 is an enlarged side view of an actuator arm with the base plate, the hinge plate and the load beam attached.

Referring now to FIG. 2 there is depicted an enlarged perspective view of the suspension assembly 38 with the slider 42 of FIG. 1. The suspension assembly 38 includes a trace gimbal 62 (as shown in FIG. 3), a load beam 64 (as shown in FIG. 4), a hinge plate 66 (as shown in FIG. 5) and a base plate 68 (as shown in FIG. 6). FIG. 7 is an enlarged side view of a portion of the actuator arm 34 with the base plate 68, the hinge plate 66 and the load beam 64 attached.

An aspect of the present invention can be regarded as a suspension assembly, such as suspension assembly 38, for use with the actuator arm 34 of the disk drive 10. The suspension assembly 38 includes a load beam 64 and the generally rectangular base plate 68. The base plate 68 defines a longitudinal axis 70. The base plate 68 includes an actuator arm end 72 including a swage opening 74 disposed along the longitudinal axis 70 for swage attachment to the actuator arm 34. The base plate 68 further includes a head gimbal end 76 disposed opposite the actuator arm end 72. The head gimbal end 76 is disposed in mechanical communication with the load beam 64 for distally supporting the load beam 64. The head gimbal end 76 defines opposing first and second distal corners 78, 80. The base plate 68 further includes first and second mass reduction openings 82, 84 formed through the base plate 68 symmetrically about the longitudinal axis 70 at the head gimbal end 76 for locally reducing mass to mitigate torsional vibration mode frequency about the longitudinal axis 70. The first mass reduction opening 82 is disposed at the head gimbal end 76 between the first distal corner 78 and the longitudinal axis 70. The second mass reduction opening 84 is disposed at the head gimbal end 76 between the second distal corner 80 and the longitudinal axis 70.

In further detail, it is contemplated that use of the first and second mass reduction openings 82, 84 acts to remove mass from the base plate 68 in comparison to a solid plate. The locations of such openings 82, 84 is specifically located to reduce mass in those areas which heavily influence torsional vibration of the base plate 68 with respect to the longitudinal axis 70. As such, the present invention specifically contemplates the first and second mass reduction openings 82, 84 be disposed at the head gimbal end 76 respectively between the first and second distal corners 78, 80 and the longitudinal axis 70. Moreover, it is contemplated that use of the first and second mass reduction openings 82, 84 may result in the local portions of the base plate 68 becoming relatively stiffer. Inclusion of such first and second mass reduction openings 82, 84 may result in the base plate 68 locally having a truss-like characteristic. Thus, the combination of the locally reduced mass and increased stiffness is contemplated to relatively mitigate the effects of the torsional vibration mode frequency about the longitudinal axis 70.

According to various embodiments, the base plate 68 includes opposing first and second lateral sides 86, 88. The first distal corner 78 is defined by the intersection of the first lateral side 86 and the head gimbal end 76. The second distal corner 80 is defined by the intersection of the second lateral side 88 and the head gimbal end 76. While the first and second distal corners 78, 80 are depicted as being rather sharp transitions, it is contemplated that the first and second distal corners 78, 80 may be more of a rounded character.

The base plate 68 and the first and second mass reduction openings 82, 84 may be of various dimensions. For example, the base plate 68 may be about 5 mm wide along the actuator arm and head gimbal ends 72, 76. The base plate 68 may be about 9 mm long along the first and second lateral sides 86, 88. Further, the first and second mass reduction openings 82, 84 may be circular as shown and have diameters of about 1.25 mm. The first and second mass reduction openings 82, 84 may be respectively spaced about 0.5 mm from the head gimbal end 76. The first and second mass reduction openings 82, 84 may be spaced about 0.25 mm respectively from the first and second lateral sides 86, 88. It is contemplated that the base plate 68 may be formed of various materials, such as stainless steel for example.

Figure 8:
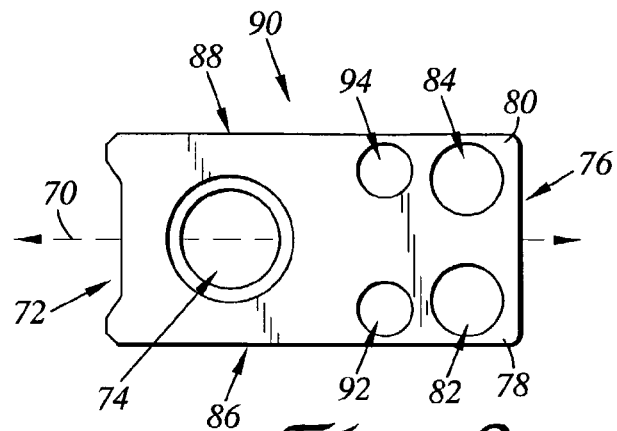
FIG. 8 is an enlarged plan view of a base plate according to anther embodiment.

Referring now to FIG. 8, there is depicted a plan view of a base plate 90 according to another embodiment. The base plate 90 is similar in respects to the base plate 68, and similar reference numerals indicate like structures with the differences noted. In this embodiment, the base plate 90 includes third and fourth mass reduction openings 92, 94 formed through the base plate 90 symmetrically disposed about the longitudinal axis 70. The third and forth mass reduction openings 92, 94 are disposed between the swage opening 74 and the first and second mass reduction openings 82, 84. The third and forth mass reduction openings 92, 94 are shown as being smaller in size than the first and second mass reduction openings 82, 84. It is contemplated that the third and fourth mass reduction openings 82, 84 may be sized, shaped and located in other configurations as well.

Figure 9:
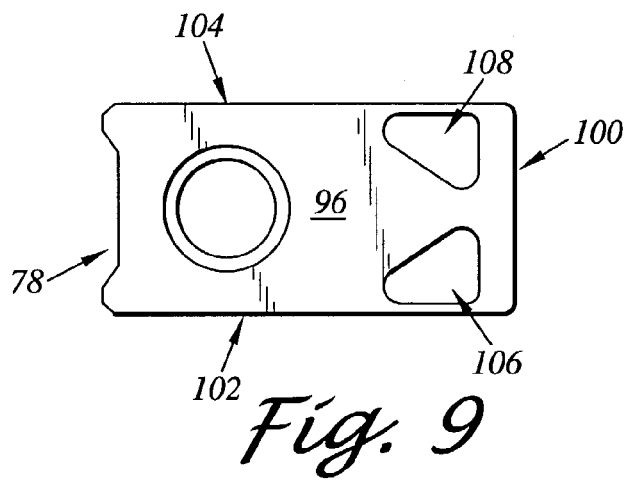
FIG. 9 is a plan view of a base plate according to another embodiment.

Referring now to FIG. 9 there is depicted a base plate 96 according to another embodiment. The base plate 96 includes an actuator arm end 98 and an opposing head gimbal end 100. The base plate 96 further includes opposing lateral sides 102, 104. The base plate 96 features first and second mass reduction openings 106, 108. In this regard, it is contemplated that the first and second mass reduction openings 106, 108 may be generally polygon shaped, in this case triangular. The first and second mass reduction openings 106, 108 may each generally define a mass reduction opening center with each mass reduction opening center being bias towards the head gimbal end 100. In this embodiment the first and second mass reduction openings 106, 108 are further biased with respect to the lateral sides 102, 104.

Figure 10:
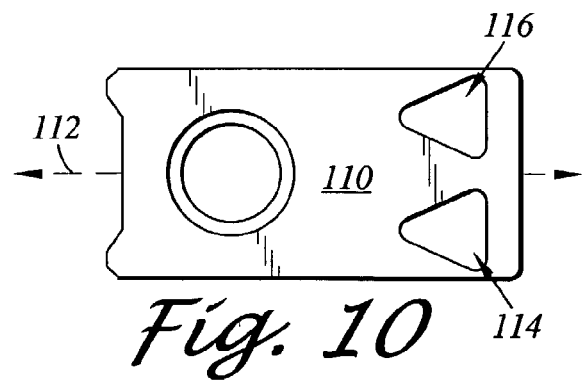
FIG. 10 is a plan view of a base plate according to yet another embodiment.

Referring now to FIG. 10 there is depicted a base plate 110. The base plate 110 defines a longitudinal axis 112 and includes first and second mass reduction openings 114, 116. In this embodiment each of the first and second mass reduction openings 114, 116 are symmetric with respect to respective axes parallel to the longitudinal axis 112.

According to another aspect of the present invention, there is provided the disk drive 10. The disk drive 10 includes a disk drive base 12. The disk drive 10 further includes an actuator 30 rotatably coupled to the disk drive base 12 and includes an actuator arm, such as actuator arm 34. The disk drive 10 further includes a suspension assembly, such as suspension assembly 38 as described above.

What is claimed is:

1. A suspension assembly for use with an actuator arm of a disk drive, the suspension assembly comprising:
   a load beam; and
   a generally rectangular base plate, the base plate defining a longitudinal axis, the base plate including:
   an actuator arm end including a swage opening disposed along the longitudinal axis for swage attachment to the actuator arm;
   a head gimbal end disposed opposite the actuator arm end, the head gimbal end in mechanical communication with the load beam for distally supporting the load beam, the head gimbal end defining opposing first and second distal corners extending beyond the actuator arm when the actuator arm end is attached to the actuator arm; and
   first and second mass reduction openings extending beyond the actuator arm when the actuator arm end is attached to the actuator arm formed through the base plate symmetrically about the longitudinal axis at the head gimbal end for locally reducing mass to mitigate torsional vibration mode frequency about the longitudinal axis, the first and second mass reduction openings being free of any mass therein, the first mass reduction opening disposed at the head gimbal end between the first distal corner and the longitudinal axis, the second mass reduction opening disposed at the head gimbal end between the second distal corner and the longitudinal axis.

2. The suspension assembly of claim 1 wherein the mass reduction openings are generally circular shaped.

3. The suspension assembly of claim 1 wherein the mass reduction openings are generally polygon shaped.

4. The suspension assembly of claim 1 wherein the mass reduction openings each generally defining a mass reduction opening center, each mass reduction opening center being bias towards the head gimbal end.

5. The suspension assembly of claim 1 wherein the base plate further includes third and fourth mass reduction openings formed through the base plate symmetrically disposed about the longitudinal axis, the third and forth mass reduction openings are disposed between the swage opening and the first and second mass reduction openings.

6. The suspension assembly of claim 1 wherein the base plate is formed of stainless steel.

7. A disk drive comprising:
   a disk drive base; and
   an actuator rotatably coupled to the disk drive base, the actuator including:
   an actuator arm; and
   a suspension assembly including:
   a load beam; and
   a generally rectangular base plate, the base plate defining a longitudinal axis, the base plate including:
   an actuator arm end including a swage opening disposed along the longitudinal axis, the actuator arm end being swage attached to the actuator arm through the swage opening;
   a head gimbal end disposed opposite the actuator arm end, the head gimbal end in mechanical communication with the load beam for distally supporting the load beam, the head gimbal end defining opposing first and second distal corners extending beyond the actuator arm; and first and second mass reduction openings extending beyond the actuator arm formed through the base plate symmetrically about the longitudinal axis at the head gimbal end for locally reducing mass to mitigate torsional vibration mode frequency about the longitudinal axis, the first and second mass reduction opening being free of any mass therein, the first mass reduction opening disposed at the head gimbal end between the first distal corner and the longitudinal axis, the second mass reduction opening disposed at the head gimbal end between the second distal corner and the longitudinal axis.

8. The disk drive of claim 7 wherein the mass reduction openings are generally circular shaped.

9. The disk drive of claim 7 wherein the mass reduction openings are generally polygon shaped.

10. The disk drive of claim 7 wherein the mass reduction openings each generally defining a mass reduction opening center, each mass reduction opening center being bias towards the head gimbal end.

11. The disk drive of claim 7 wherein the base plate further includes third and fourth mass reduction openings formed through the base plate symmetrically disposed about the longitudinal axis, the third and forth mass reduction openings are disposed between the swage opening and the first and second mass reduction openings.

12. The disk drive of claim 7 wherein the base plate is formed of stainless steel.

* * * * *